(12) United States Patent
Steele, Jr.

(10) Patent No.: US 6,356,927 B2
(45) Date of Patent: *Mar. 12, 2002

(54) SYSTEM AND METHOD FOR FLOATING-POINT COMPUTATION

(75) Inventor: Guy L. Steele, Jr., Lexington, MA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/576,311

(22) Filed: May 22, 2000

Related U.S. Application Data

(62) Division of application No. 08/987,724, filed on Dec. 9, 1997, now Pat. No. 6,289,365.

(51) Int. Cl.[7] .................................................. G06F 7/38
(52) U.S. Cl. ....................................................... 708/497
(58) Field of Search ................................ 708/496–497, 708/550–551

(56) References Cited

U.S. PATENT DOCUMENTS 5,313,415 A * 5/1994 Taniguchi ................... 708/497
5,430,668 A * 7/1995 Hagihara .................... 708/497
5,841,683 A * 11/1998 Bechade et al. ............ 708/497
5,995,992 A * 11/1999 Eckard ....................... 708/497

* cited by examiner

Primary Examiner—Tan V. Mai
(74) Attorney, Agent, or Firm—Cesari & McKenna, LLP

(57) ABSTRACT

A system is disclosed for performing floating point computation in connection with numbers in a base floating point representation (such as the representation defined in IEEE Std. 754) that defines a plurality of formats, including a normalized format and a de-normalized format, using a common floating point representation that defines a unitary normalized format. The system includes a base to common representation converter, a processor and a common to base representation converter. The base to common representation converter converts numbers from the base floating point representation to the common floating point representation, so that all numbers involved in a computatoin will be expressed in the unitary normalized format. The processor is configured to perform a mathematical operation of at least one predetermined type in connection with the converted numbers generated by the base to common representation converter to generate a floating point result in the common representation. The common to base representation converter converts numbers from the common floating point representation selectively to either the normalized or de-normalized format of the base representation.

4 Claims, 4 Drawing Sheets

US 6,356,927 B2

SYSTEM AND METHOD FOR FLOATING-POINT COMPUTATION

This is a divisional of application of Ser. No. 08/987,724 filed Dec. 9, 1997 now U.S. Pat. No. 6,289,365.

FIELD OF THE INVENTION

The invention generally relates to systems and methods for performing floating point computation, and more particularly to systems and methods for performing floating point computations which conform to behavior specified in IEEE Standard ("Std.") 754. The invention provides a common representational format for numbers and other values for which diverse formats are specified in IEEE Std. 754.

BACKGROUND OF THE INVENTION

Digital electronic devices, such as digital computers, calculators, and other devices, perform arithmetic calculations on values in integer, or "fixed point," format, in fractional, or "floating point" format, or both. IEEE Standard 754, (hereinafter "IEEE Std. 754" or "the Standard")) published in 1985 by the Institute of Electrical and Electronic Engineers, and adopted by the American National Standards Institute (ANSI), defines several standard formats for expressing values in floating point format, and a number of aspects regarding behavior of computation in connection therewith. In accordance with IEEE Std. 754, value $(-1)^s 2^e f$ in a representation in floating point format comprises a plurality of binary digits, or "bits," having the structure $$s\ e_{msb} \ldots e_{lsb} f_{msb} \ldots f_{lsb}$$

where bit "s" is a sign bit indicating whether the entire value is positive or negative, bits "$e_{msb} \ldots e_{lsb}$" comprise an exponent field represent the exponent "e" in unsigned binary biased format, and bits "$f_{msb} \ldots f_{lsb}$" comprise a fraction field that represents the fractional portion "f" in unsigned binary format ("msb" represents "most significant bit" and "lsb" represents "least significant bit"). The Standard defines two general formats, namely, a "single" format which comprises thirty-two bits, and a "double" format which comprises sixty-four bits. In the single format, there is one sign bit "s," eight bits "$e_7 \ldots e_0$" comprising the exponent field and twenty-three bits "$f_{22} \ldots f_0$" comprising the fraction field. In the double format, there is one sign bit "s," eleven bits "$e_{10} \ldots e_0$" comprising the exponent field and fifty-two bits "$f_{51} \ldots f_0$" comprising the fraction field.

As indicated above, the exponent field of the floating point representation "$e_{msb} \ldots e_{lsb}$" represents the exponent "E" in biased format. The biased format provides a mechanism by which the sign of the exponent is implicitly indicated. In particular, the bits "$e_{msb} \ldots e_{lsb}$" represent a binary encoded value "e" such that "e=E+bias." This allows the exponent E to extend from −126 to +127, in the eight-bit "single" format, and from −1022 to +1023 in the eleven-bit "double" format, and provides for relatively easy manipulation of the exponents in multiplication and division operations, in which the exponents are added and subtracted, respectively.

IEEE Std. 754 provides for several different formats with both the single and double formats which are generally based on the bit patterns of the bits "$e_{msb} \ldots e_{lsb}$" comprising the exponent field and the bits $f_{msb} \ldots f_{lsb}$ comprising the fraction field. If a number is represented all of the bits "$e_{msb} \ldots e_{lsb}$" of the exponent field are binary one's (that is, if the bits represent a binary-encoded value of "255" in the single format or "2047" in the double format) and all of the bits $f_{msb} \ldots f_{lsb}$ of the fraction field are binary zeros, then the value of the number is positive or negative infinity, depending on the value of the sign bit "s;" in particular, the value "v" is $v=(-1)^s \infty$, where "∞" represents the value "infinity." On the other hand, If all of the bits "$e_{msb} \ldots e_{lsb}$" of the exponent field are binary one's and if the bits $f_{msb} \ldots f_{lsb}$ of the fraction field are not all zero's, then the value that is represented is deemed "not a number," abbreviated in the Standard by "NaN."

If a number has an exponent field in which the bits "$e_{msb} \ldots e_{lsb}$" are neither all binary ones nor all binary zeros (that is, if the bits represent a binary-encoded value between 1 and 254 in the single format or between 1 and 2046 in the double format), the number is said to be in a "normalized" format. For a number in the normalized format, the value represented by the number is $v=(-1)^s 2^{e-bias} (1.|f_{msb} \ldots f_{lsb})$, where "|" represents a concatenation operation. Effectively, in the normalized format, there is an implicit most significant digit having the value "one," so that the twenty-three digits in the fraction field of the single format, or the fifty-two digits in the fraction field of the double format, will effectively represent a fraction having twenty-four digits or fifty-three digits of precision, respectively.

Finally, if a number has an exponent field in which the bits "$e_{mbs} \ldots e_{lsb}$" are all binary zeros, representing the binary-encoded value of "zero," the number is said to be in a "de-normalized" format. For a number in the de-normalized format, the value represented by the number is $v=(-1)^s 2_{e-bias}(0.|f_{msb} \ldots f_{lsb})$. It will be appreciated that the range of values of numbers that can be expressed in the de-normalized format is disjoint from the range of values of numbers that can be expressed in the normalized format, for both the single and double formats.

A problem arises in connection with numbers in the de-normalized format. In particular, numbers in the de-normalized format are difficult to process and to produce.

SUMMARY OF THE INVENTION

The invention provides anew and improved system and method for performing floating point computations on numbers using a new representation that provides a common representational format for numbers which would, in accordance with the IEEE Std. 754, be in normalized format as well as numbers which would, in accordance with the IEEE Std. 754, be in de-normalized format. The invention further provides an arrangement for converting numbers between the new representation and the respective normalized or de-normalized format, as appropriate.

In brief summary, embodiments of the invention provide a system for performing floating point computation in connection with numbers in a base floating point representation that defines a plurality of formats, including a normalized format and a de-normalized format, using a common floating point representation that defines a unitary normalized format. The system comprises a base to common representation converter and a processor. The base to common representation converter is configured to convert the numbers in the base floating point representation to a common floating point representation, so that all numbers involved in a computatoin will be expressed in the unitary normalized format. The processor is configured to perform a mathematical operation of at least one predetermined type in connection with the converted numbers generated by said representation converter to generate a floating point result in the common representation. Embodiments of the invention can further comprise a common to base representation converter configured to convert numbers from the common floating point representation selectively to either the normalized or de-normalized format of the base representation. In particular embodiments of the invention, the base floating point representation corresponds to that defined by the IEEE Std. 754.

By providing a common floating point representation, the floating point numbers in the base floating point representation that are to be used during a computation can be converted to the common floating point representation, and the computation can proceed using the common representation. This will eliminate the necessity of converting numbers between normalized and de-normalized formats during the computation which may be necessary in, for example, computations involving numbers that are represented in different formats in the IEEE Std. 754 representation.

BRIEF DESCRIPTION OF TIE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
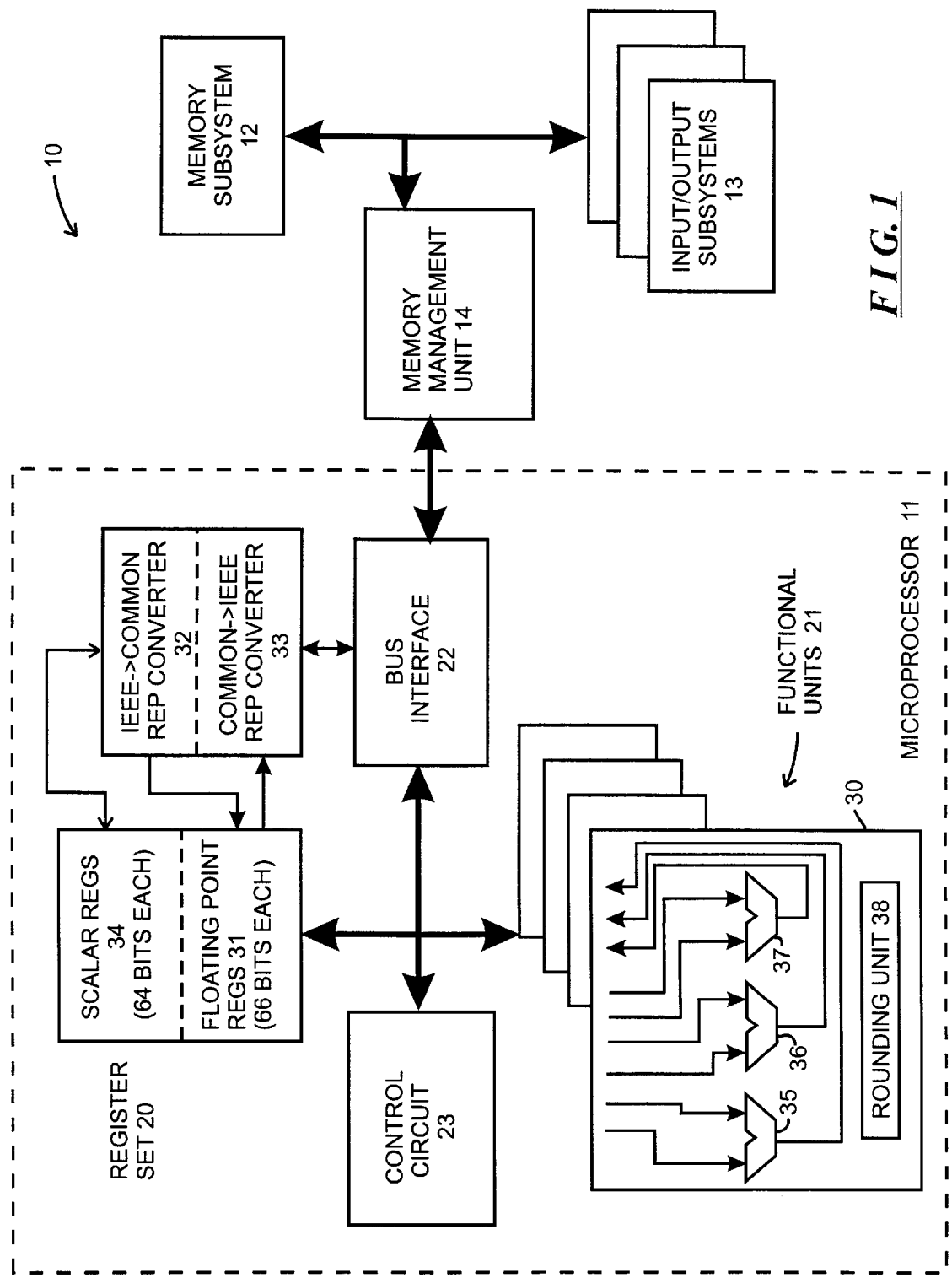
FIG. 1 is a functional block diagram of a digital computer including a functional unit for performing floating point computations using a new common representational format, constructed in accordance with the invention.

FIG. 1 depicts a functional block diagram of a digital computer 10 including a functional unit for performing floating point computations using a common representation format for all numbers and other values that can be accommodated using the various formats of the representations defined in IEEE Std. 754. With reference to FIG. 1, the digital computer system 10 includes a microprocessor 11 which communicates with a memory subsystem 12 and one or more input/output subsystems generally identified by reference numeral 13 through a memory management unit 14. The memory subsystem 12 includes a number of physical addressable storage locations in which data and instructions (which will be referred to collectively herein as "information") to be processed by the microprocessor 11 may be stored. In addition, the microprocessor 11, after processing data, may transfer the processed data to the memory subsystem 12 for storage.

The digital computer system 10 may include a number of diverse types of input/output subsystems 13, including mass storage subsystems, operator input and output subsystems, network ports and the like. The mass storage subsystems generally provide long-term storage for information which may be processed by the microprocessor 11. The mass storage subsystems may include such devices as disk or tape subsystems, optical disk storage devices and CD-ROM devices in which information may be stored and/or from which information may be retrieved. One or more of the mass storage subsystems may utilize removable storage media which may be removed and installed by an operator, which may allow the operator to load programs and data into the digital computer system 10 and obtain processed data therefrom. Under control of control information provided thereto by the microprocessor 11, information stored in the mass storage subsystems may be transferred to the memory subsystem 12 for storage. After the information is stored in the memory subsystem 12, the microprocessor 11 may retrieve it from the memory subsystem 12 for processing. After the processed data is generated, the microprocessor 11 may also enable the mass storage subsystems to retrieve the processed data from the memory subsystem 12 for relatively long-term storage.

The operator input and output subsystems generally provide an operator interface to the digital computer system 10. In particular, the operator input subsystems may include, for example, keyboard and mouse devices, which an operator may use to interactively input information to the digital computer system 10 for processing. In addition, the operator input subsystems may provide mechanisms whereby the operator may control the digital computer system 10. The operator output subsystems may include devices such as video display devices, through which the digital computer system 10, under control of the microprocessor 11, displays results of processing to the operator. In addition, a printer may be provided to provide a hardcopy output for the operator.

The network ports may enable the digital computer system 10 to connect to a communication link, thereby connecting the computer system 10 in a computer network. The network ports enable the computer system 10 to transmit information (including both program instructions and data) to, and receive information from, other computer systems and other devices in the network (not shown). In a typical network organized according to, for example, the client-server paradigm, certain computer systems in the network are designated as servers, which store information for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

As is conventional, each of the input/output subsystems 13 will typically include registers and other data storage elements (not shown) which store control, status and other information which are used to control the operations performed by the respective input/output subsystem 13 and to indicate its operational status. The microprocessor 11 may store information in the registers and other data storage elements, thereby to control the respective input/output subsystem 13, in manner similar to the manner in which it stores information in the memory subsystem 12. Similarly, the microprocessor 11 may retrieve the information contained in the input/output subsystem 13, in a manner similar to the manner in which it retrieves information in the memory subsystem 12, to ascertain the operational status of the respective input/output subsystem 13.

The memory management unit 14 performs a number of operations. In particular, the memory management unit 14 typically includes a memory cache, which caches information requested by the microprocessor 11 from the memory subsystem 12. In addition, as is typical, when the microprocessor 11 requests information to be retrieved from, for example, the memory subsystem 12, or provides processed data for storage in, for example, the memory subsystem 12, the microprocessor 11 will provide an address in a virtual address space to the memory management unit 14. The various application programs processed by the microprocessor 11 may be provided with respective virtual address spaces. The virtual address space is divided into "pages," each of which comprises a selected number of virtual addressable storage locations, with each virtual addressable storage location storing information. The pages of an application program's virtual address space are normally stored on a mass storage subsystem, and the microprocessor 11 enables individual ones of the pages to be copied to the memory subsystem 12 as they are needed during processing, and for those pages that are modified during processing the microprocessor 11 may enable them to be copied to the mass storage subsystem for long-term storage.

Respective pages of a virtual address space may be compactly stored in physical locations in the memory subsystem 12, which are identified by physical addresses, and in performing an access operation in connection with a particular virtual address space location (that is, a retrieval of information from or a storage of information in a particular physical location) in response to a request from the microprocessor 11, the memory management unit 14 will perform a translation of the virtual address to obtain the physical address for use in performing the access operation in connection with the memory subsystem 12. In addition, the memory management unit 14 may perform several checking operations, including checking to determine whether or not the page is in the memory subsystem 12, whether or not the application program has permission to access (that is, read data from or write data into) the page, and whether or not the requested page is a valid page in the virtual address space, and the like. If the memory management unit 14 makes a negative determination in the checking operation, that is, if it determines, for example, that the page is not in the memory subsystem 12, that the application program does not have the appropriate access permission, or if it determines that the requested page of the virtual address space page is not a valid page in the application program's virtual address space, it may generate an ACCESS FAULT indication, which the microprocessor 11 may receive and use in performing selected fault handling operations.

The microprocessor 11 generally includes a number of elements, including a register set 20, one or more functional units generally identified by reference numeral 21, a bus interface 22 and a control circuit 23. The control circuit 23 controls the processing operations as performed by the microprocessor 11 under control of instructions provided by a program. Generally, under control of the control circuit 23, the bus interface 22, cooperating with the memory management unit 14, retrieves instructions and data from the memory subsystem 12 or data storage elements maintained by particular input/output subsystems 13 for processing and loads the retrieved data into registers in the register set 20. Also under control of the control circuit 23, the functional units 21 perform logical, integer and floating point arithmetic, and other processing operations in connection with data which the control circuit 23 enables to be transferred thereto from the register set 20, to generate processed data which will be transferred to the register set 20 for storage. The control circuit 23 may also enable the bus interface 22, also cooperating with the memory management unit 14, to transfer processed data from the register set 20 to the memory subsystem 12 or data storage elements maintained by particular input/output subsystems 13 for storage.

As noted above, the invention provides an arrangement for performing floating point computation using a common floating point representation, in particular a common representation for numbers and other values that would be represented in all of the formats defined by IEEE Std. 754, including numbers represented in the de-normalized format. In the common representation, the number of bits that are used to represent a number is generally two bits larger than the number of bits that are used to represent a number in the IEEE Std. 754. That is, if a number is represented in the thirty-two bit "single" format defined in the IEEE Std. 754, in the common representation described herein the number would be represented by thirty-four bits. In addition, if a number is represented in the sixty-four bit "double" format defined in the IEEE Std. 754, in the common representation described herein, the number would be represented by sixty-six bits. In the following, the arrangement will be described in connection with the sixty-four bit "double" format and the sixty-six bit common representation, and extensions to the thirty-two bit "single" format and thirty-four bit common representation will be apparent to those skilled in the art.

In accordance with the invention, the microprocessor 11 is provided with a functional unit 30 for performing floating point computations on numbers and other values, each defined by sixty-six bit words, a set of sixty-six bit floating point registers, generally identified by reference numeral 31, each for storing sixty-six bits of information, and converters 32 and 33 for converting numbers from the sixty-four bit IEEE Std. 754 representation to the sixty-six bit common representation, and from the sixty-six bit common representation to the sixty-four bit IEEE Std. 754 representation, respectively. The structure and operation of the converters 32 and 33 will be described below in connection with FIGS. 2 and 3, respectively. It will be appreciated that the microprocessor 11 also includes, in the register set 20, a set of sixty-four bit registers, identified as scalar register set 34, for storing information in sixty-four bit representations or subsets thereof, such as the conventional thirty-two bit, sixteen bit and eight bit representations, which may include floating point numbers and other values in the IEEE Std. 754 representation. The IEEE Std. 754 to common representation converter 32 receives numbers and other values in the IEEE Std. 754 representation from the bus interface 22 or the scalar register set 34, converts them to the common representation and provides them to the floating point register set 31 for storage. In addition, the common to IEEE Std. 754 representation converter 33 receives numbers and other values in the IEEE Std. 754 representation, converts them to the IEEE Std. 754 representation and provides them to the scalar register set 34 or to the bus interface 22 for storage.

The floating point functional unit 30 for use in connection with the common representation comprises several elements, including, for example, an adder 35, a multiplier 36, a multiplier 36, a divider 37 and a rounding unit 38. Adder 35, multiplier 36 and divider 37 are structured and operate in a manner generally similar to corresponding elements which may be provided in a floating point functional unit for use in connection with the IEEE Std. 754 representation, except that they (that is, elements 35, 36 and 37) will include circuitry to accommodate processing of different number of bits than would be used in connection with the IEEE Std. 754 representation. The rounding unit 38 performs arithmetical rounding of the results generated by the elements 35,36 and 37 to accommodate various rounding modes defined by the IEEE Std. 754. The structure and operation of the rounding unit 38 to accommodate processing of numbers and other values in the common representation in connection with one of the rounding modes will be described below; the structure and operation for use in connection with other rounding modes will be apparent to those skilled in the art. The control circuit 23, in response to floating point instructions provided thereto by bus interface 22, enables numbers and other values to be selectively transferred from the floating point register set 31 to the adder 35, multiplier 36 and divider 37, which process them to generate results which, after rounding as necessary by the rounding unit, will be transferred to the floating point register set 31 for storage.

Before proceeding further, it would be helpful to describe the structure of the common representation and the relationship between the IEEE Std. 754 representation and the common representation. In the following, the sixty-four bit "double" format of the IEEE Std. 754 representation and the associated sixty-six bit common representation will be described; for the thirty-two bit "single" format of the IEEE Std. 754, the associated thirty-four bit common representation will be apparent to those skilled in the art. As noted above, the double format of the IEEE Std 754 representation comprises $$s\ e_{10} \ldots e_0 f_{51} \ldots f_0$$

where "s" is a one-bit sign field, "$e_{10} \ldots e_0$" is an eleven bit exponent field and "$f_{51} \ldots f_0$" is a fifty-two bit fraction field. Using the double format, the following can be represented:

(i) numbers having a values of positive and negative zero, in which all of the bits of both the exponent field and the fraction field have the value zero, the value of the sign bit "s" determining whether the number has a value positive zero or negative zero;

(ii) numbers having the value of positive or negative infinity, in which all of the bits of the exponent field have the value "one" and the bits of the fraction field have the value zero; for a number having the value of positive infinity, the bit of the sign field is "zero," and for a number having the value of negative infinity, the bit of the sign field is "one;"

(iii) numbers which have values other than positive or negative zero or positive or negative infinity in a "normalized" format, in which the bits of the exponent field are not all zero or one; in the normalized format, the most significant bit of the fraction portion of the number, which always has the value "one," is implicit and is not provided in the representation;

(iv) numbers which have values other than other than positive or negative zero or positive or negative infinity in a "de-normalized" format, in which all of the bits of the exponent field are zero; and (v) "not a number" ("NaN") values, in which all of the bits of the exponent field have the value one, but at least one of the bits of the fraction field has a value other than zero.

A value in the common representation is of the form $$S\ E_{11} \ldots E_0 F_{52} \ldots F_0$$

where "S" is a one-bit sign field, "$E_{11} \ldots E_0$" is a twelve bit exponent field and "$F_{52} \ldots F_0$" is a fifty-three bit fraction field. A value in the common representation is formed from a number or a NaN value in double format of the IEEE Std. 754 representation, the sign bit "S" of the sign field of the common representation corresponds to the sign bit "s" of the sign field of the IEEE Std. 754 representation, and the exponent and fraction fields of the common representation are derived from the corresponding fields of the IEEE Std. 754 representation as follows. Generally, for the exponent portion of the values in the common representation, the value of the exponent is biased about $2^{11}$ (that is, 100000000000 in binary form), which will allow the exponent of any number or other value in the IEEE Std. 754 representation to be expressed.

More specifically, (i) for a number in the IEEE Std. 754 representation which has the value positive or negative zero,
  (a) the bits comprising the fraction portion will all have the value "zero," and
  (b) the bits comprising the exponent will comprise the value $2^{11}-52$, which corresponds to "011111001100" in binary form;

(ii) for a number in the IEEE Std. 754 representation which has the value positive or negative infinity,
  (a) the most significant bit $F_{52}$ of the faction field of the common representation will have the value "one" and the other bits $F_{51} \ldots F_0$ will all have the value "zero," and
  (b) the bits comprising the exponent portion will all have the value "one" (that is, "111111111111"), which corresponds to the bias value "100000000000" plus "11111111111," the value of the exponent field in the EEE Std. 754 representation;

(iii) for a number in the IEEE Std. 754 representation which has a value in the normalized format,
  (a) the bits comprising the fraction portion will correspond to the bits comprising the fraction portion of the IEEE Std. 754 representation, with the implicit most significant bit of the IEEE Std 754 representation being explicitly represented in the common representation; that is, bits $F_{52} \ldots F_0$ of the common representation correspond to "$1|f_{51} \ldots f_0,$" where "$f_{51} \ldots f_0$" correspond to the bits of the fraction field of the IEEE Std. 754 representation and "|" represents the concatenation operation; and
  (b) the bits comprising the exponent portion will comprise the value $2^{11}+e$, where "e" represents the binary-encoded value of the exponent field of the IEEE Std. 754 representation; that is, bits $E_{11} \ldots E_0$ of the common representation correspond to "$1|e_{10} \ldots e_0,$" where "$e_{10} \ldots e_0$" correspond to the bits of the exponent field of the IEEE Std. 754 representation and "|" represents the concatenation operation;

(iv) for a number in the IEEE Std. 754 representation which has a value in the de-normalized format,
  (a) the bits comprising the fraction field of the common representation will correspond to the bits comprising the fraction portion of the IEEE Std. 754 representation, shifted to the left until the most significant bit $F_{52}$ contains the value "one;" the effect is to multiply the value in the fraction field of the IEEE Std. 754 representation by $2^k$, where "k" corresponds to the number of bit positions $e_{51} \ldots e_{51-k}$ between the most significant bit position "$e_{51}$" of the fraction field and the most significant bit position $e_{51-k}$" of the fraction field which contains a bit having the value "one;" in addition, the bit $F_0$ will be provided with the value "zero;"

(b) the bits comprising the exponent field of the common representation will correspond to "$2^{11}$-k," that is, "100000000000" minus "k;"

effectively, for each shift of the value in the fraction field to the left, the value of the number is effectively multiplied by two, and to compensate the value of the exponent is reduced by one thereby to effectively divide the value of the number by two; the result provides a value in the common representation in a normalized format which corresponds to the value in the IEEE Std. 754 representation in de-normalized format; and (v) for a value in the IEEE Std. 754 representation which is "NaN" (not a number), (a) the most significant bit $F_{52}$ of the fraction field of the common representation will have the value "one" and the other bits $F_{51} \ldots F_0$ will all have the values corresponding to bits $f_{51} \ldots f_0$ of the IEEE Std 754 representation, and (b) the bits comprising the exponent portion will all have the value "one" (that is, "111111111111"), which corresponds to the bias value "100000000000" plus "11111111111," the value of the exponent field in the IEEE Std. 754 representation.

Conversely, from items (i) through (v) above, it will be appreciated that:

(vi) if a number or other value in the common representation has an exponent having a high-order bit $E_{11}$ which has the value zero, then it may either have the value positive or negative zero or certain values in the de-normalized format, in which case:

(a) the bits $e_{10} \ldots e_0$ comprising the exponent field of the IEEE Std. 754 representation will all have the value "zero," and (b) the bits $f_{51} \ldots f_0$ comprising the fraction field of the IEEE Std. 754 representation will correspond to the bits $F_{52} \ldots F_1$ of the fraction field of the common representation shifted to the right by K bits, where "K" corresponds to $2^{11}$ minus the binary-encoded value represented by bits $E_{10} \ldots E_0$ of the exponent field;

(vii) if a number or other value in the common representation has an exponent having a high-order bit $E_{11}$ which has a value other than zero, and other bits $E_{10} \ldots E_0$ all of which have the value zero, it will be appreciated that the number or other value will correspond to number in the de-normalized format of the EEE Std. 754 representation for which the high-order bit f(51) of the fraction field has the value "one," in which case (a) the bits $e_{10} \ldots e_0$ comprising the exponent field of the IEEE Std. 754 representation will all have the value "zero," and (b) the bits $f_{51} \ldots f_0$ comprising the fraction field of the IEEE Std. 754 representation will correspond to the bits $F_{52} \ldots F_1$ of the fraction field of the common representation; and (viii) if a number or other value in the common representation has an exponent having a high-order bit $E_{11}$ which has a value other than zero, then it may either have a value corresponding to positive or negative infinity, a number in the normalized format, or a NaN (not a number) value, in which case:

(a) the bits $e_{10} \ldots e_0$ comprising the exponent field of the IEEE Std. 754 representation will have the values of the bits $E_{10} \ldots E_0$ of the common representation, respectively, and (b) the bits $f_{51} \ldots f_0$ comprising the fraction field of the IEEE Std. 754 representation will correspond to the bits $F_{51} \ldots F_0$ of the common representation, that is, with bit $F_{52}$ of the common representation discarded.

Figure 2:
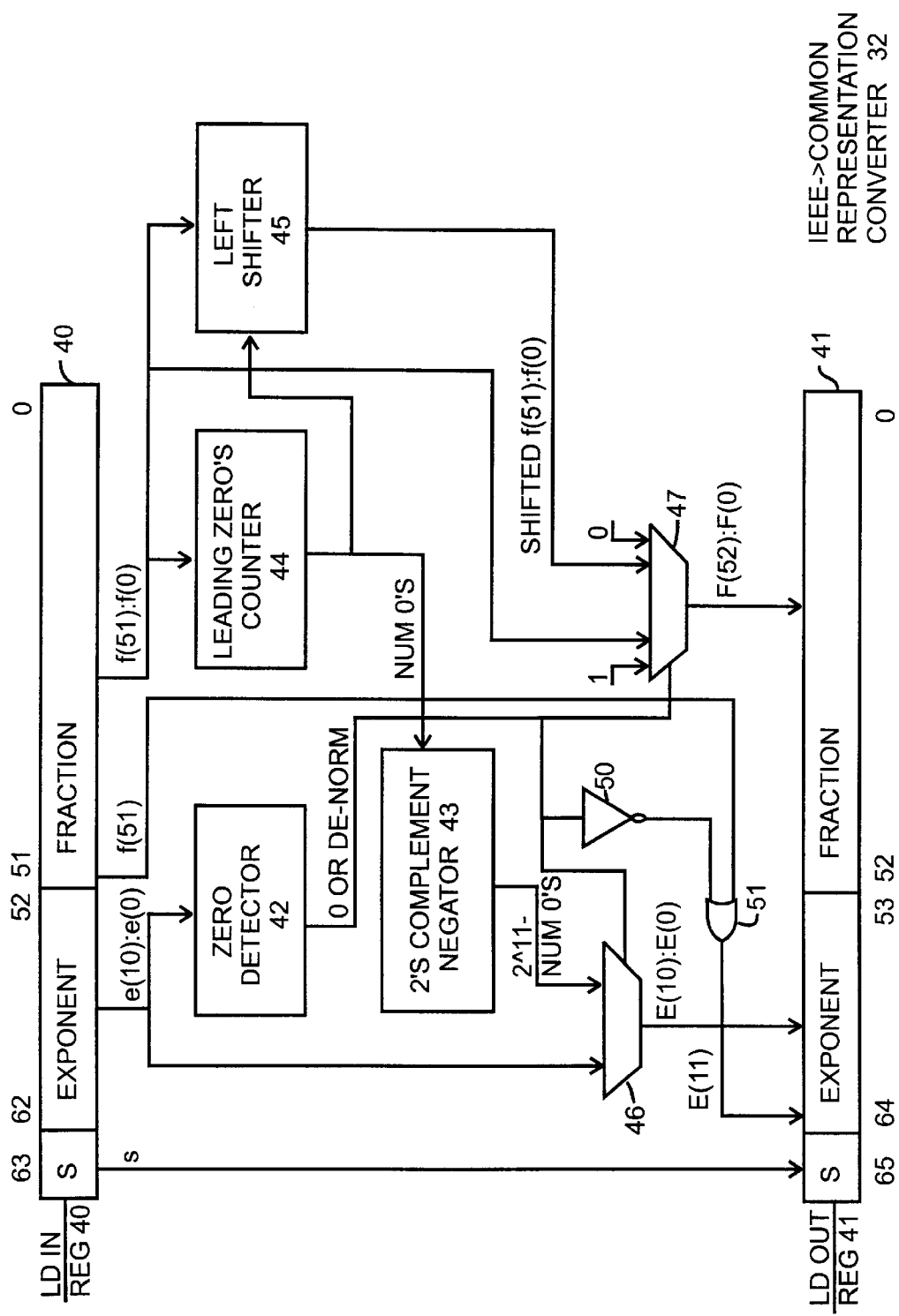
FIG. 2 is a functional block diagram of a circuit for converting numbers and other values in formats of IEEE Std. 754 to the common representational format.
Figure 3:
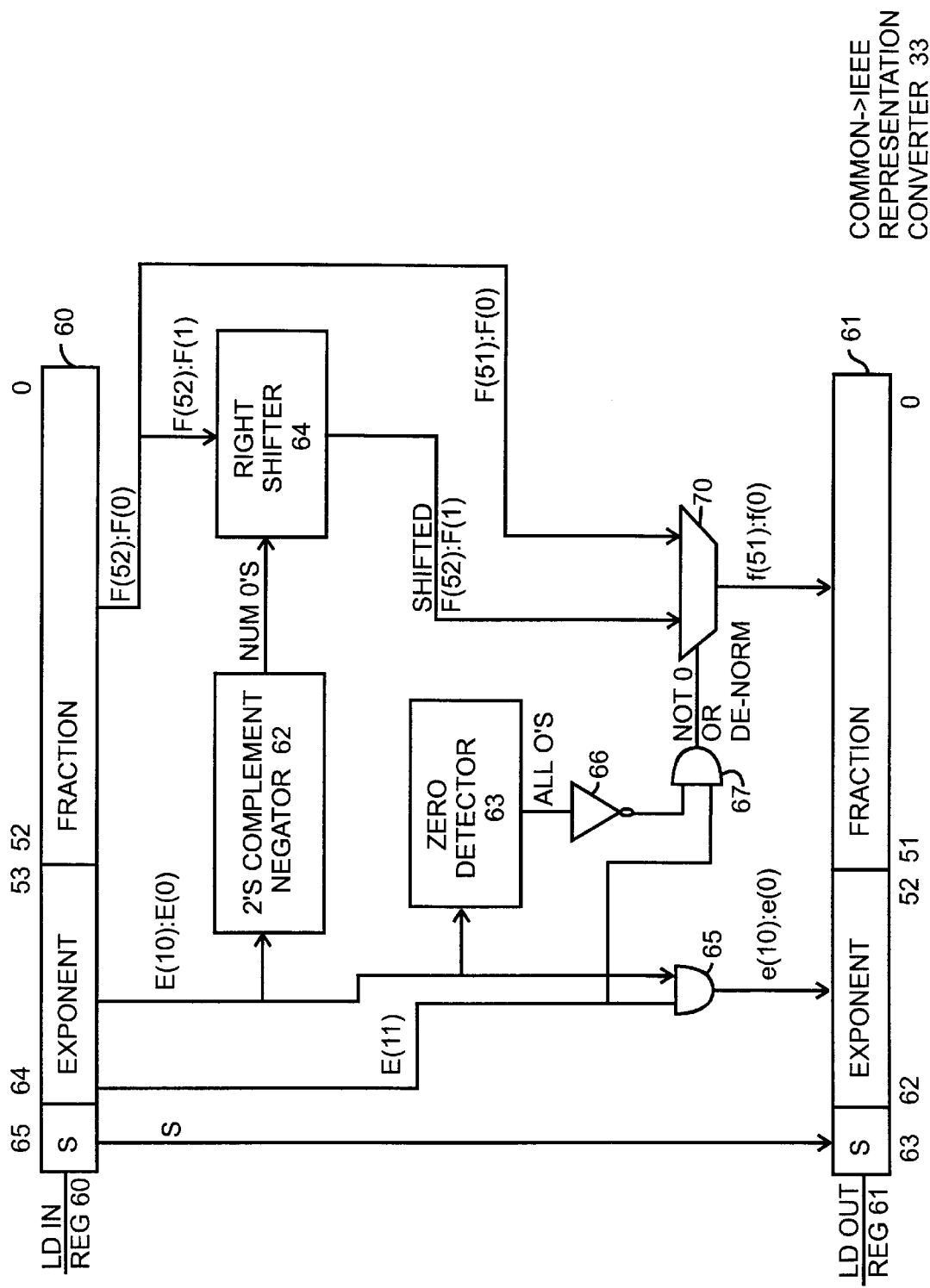
FIG. 3 is a functional block diagram of a circuit for converting numbers and other values in the common representational format to the appropriate respective format of the IEEE Std. 754.

FIGS. 2 and 3 depict functional block diagrams of the converters 32 and 33 for converting numbers in the sixty-four bit IEEE Std. 754 "double" representation to the sixty-six bit common representation, and for converting numbers in the sixty-six bit common representation to the sixty-four bit IEEE Std. 754 "double" representation, respectively. With reference initially to FIG. 2, converter 32 includes a sixty-four bit input register 40, a sixty-six bit output register 41, a zero detector 42, a two's complement negation circuit 43, a leading zero's counter 44, a left shifter 45, multiplexers 46 and 47, an inverter 50 and an OR gate 51. The input register 40 receives a number or other value in the sixty-four bit IEEE Std. 754 representation, and components 42 through 47, 50 and 51 generate bit values for the sixty-six bit common representation which are loaded into the output register 41. The input register 40 operates to store the number or other value in the sixty-four bit IEEE Std. 754 representation in response to a LD_IN_REG_40 load input register 40 signal from the control circuit 23, and the output register 40 operates to store the sixty-six bit common representation in response to a LD_OUT_REG_41 load output register 41 signal also from the control circuit 23. The control circuit 23 may also provide control signals for controlling the other components of the converter 32 as necessary. It will be appreciated that the input register 40 may comprise a register in scalar register set 34 or the bus interface 22, and the output register 41 may comprise a register in the floating point register set 31.

The input register 40 operates to store the number or other value in the sixty-four bit IEEE Std. 754 representation, that is to be converted to the common representation in the converter 32. As noted above, numbers and other values in both the IEEE Std. 754 representation and the common representation comprise a sign field, an exponent field and a fraction field. For input register 40, which stores the number or other value in the IEEE Std. 754 representation, high-order bit (63) of input register 40 stores the bit comprising the sign field, intermediate bits (62) through (52) of input register 40 store bits $e_{10} \ldots e_0$ comprising the exponent field and low-order bits (51) through (0) of input register 40 store bits $f_{51} \ldots f_0$ comprising the fraction field. For output register 40, which stores the number or other value in the common representation, high-order bit (65) of output register 41 stores the bit comprising the sign field, intermediate bits (64) through (53) of output register 41 store bits $E_{11} \ldots E_0$ comprising the exponent field and low-order bits (52) through (0) of output register 41 store bits $F_{52} \ldots F_0$ comprising the fraction field.

As noted above, the sign bit of the number or other value in the common representation corresponds to the sign bit of the number or other value in the IEEE Std. 754 representation. Accordingly, the high order bit (63) of the input register 40 provides an "s" sign signal that is provided to high order bit (65) of the output register 41 without modification. When the LD_OUT_REG_41 load output register 41 signal is asserted, the "s" signal from the input register 40 will be stored in the high order bit (65) of the output register 41 to provide the sign field of the common representation. It will be appreciated that the value stored in the high order bit (65) of output register 41 will correspond to the value stored in the high order bit (63) of the input register 40.

The bits (62) through (52) of the input register 40, which store the exponent field of number or other value in the IEEE Std. 754 representation, provide e(10):e(0) exponent signals in parallel both to one input of multiplexer 46 and to zero detector 42. The asserted or negated condition of each of the e(i) exponent signals (index "i" being an integer from zero to ten) reflects the value of the correspondingly-indexed bit $e_i$ of the exponent field that is stored in bits (62) through (52) of the input register 40. The zero detector 42 determines whether all of the e(10):e(0) exponent signals are negated, which will be the case if all of the bits $e_{10} \ldots e_0$ of the exponent field in bits (62) through (52) of input register 40 have the value zero, and asserts or negates a 0_OR_DE-NORM zero or de-normalized signal based on that determination. If the zero detector 42 determines that not all of the e(10):e(0) exponent signals are negated, it will negate a 0_OR_DE-NORM zero or de-normalized signal. If not all of the e(10):e(0) exponent signals are asserted, then at least one of the $e_{10} \ldots e_0$ bits of the exponent field will have a value other than zero, and so the number or other value stored in the input register 40 will be either positive or negative infinity, a number in normalized format, or a NaN (not a number) value. On the other hand, if the zero detector 42 determines that all of the e(10):e(0) exponent signals are negated, then all of the bits $e_{10} \ldots e_0$ of the exponent field stored in bits (62) through (52) of the input register 40 will have the value zero. In that case, the number or other value stored in the input register 40 will have either the value positive or negative zero or comprise a number in de-normalized format.

The 0_OR_DE-NORM zero or de-normalized signal provided by zero detector 42 controls multiplexers 46 and 47, and in addition is provided to the input of inverter 50. Thus, if the zero detector 42 determines that not all of the e(10):e(0) exponent signals are negated, it will negate the 0_OR_DE-NORM zero or de-normalized signal thereby to enable the multiplexer 46 to couple the e(10):e(0) exponent signals to the output register 41, in particular to bits (63) through (53) of the output register. In addition, since the 0_OR_DE-NORM zero or de-normalized signal is negated, inverter 50 will assert a signal that enables OR gate 51 to assert an E(11) exponent signal that is provided to the bit (64) of the output register 41. When the LD_OUT_REG_41 load output register 41 signal is asserted, the output register will store the E(11) exponent signal in bit (64) and the E(10):E(0) exponent signals in bits (63) through (53), respectively, of the output register 41, thereby to provide the value "$1e_{10} \ldots e_0$ as required for the exponent field of the common representation.

As noted above, the 0_OR_DE-NORM zero or de-normalized signal provided by zero detector 42 also controls the multiplexer 47. The multiplexer 47 receives, at one input, f(51):f(0) fraction signals which reflect the condition of the bits $f_{51} \ldots f_0$ of the fraction field of the number or other value stored in input register 40. That is, the f(i) fraction signal. (index "i" being an integer from zero to fifty-one) reflects the value of the correspondingly-indexed $bit_i$ of the fraction field. At the corresponding input of multiplexer 47, the multiplexer also receives an asserted 1 signal representative of the value "one." While the 0_OR_DE-NORM zero or de-normalized signal from zero detector 42 is negated, the multiplexer couples the 1 signal and the f(51):f(0) fraction signals as F(52):F(0) fraction signals to bits (52) through (0) of output register 41. That is, multiplexer 47 couples the 1 signal as the F(52) fraction signal to bit (52) of the out put register 41, and the f(51):f(0) signals as the F(51):F(0) fraction signals to bits (52) through (0) of the output register 41. Thus, when the LD_OUT_REG_41 load output register 41 signal is asserted, the output register 41 will store the 1 signal in bit (52) and the f(51):f(0) fraction signals in bits (51) through (0), respectively, of the output register, thereby to provide the value "$1|f_{51} \ldots f_0$" as required for the fraction field of the common representation. It will be appreciated that the storage of the 1 signal in bit (52) of the output register 41 explicitly provides the implicit high-order bit which is omitted from the normalized format of the IEEE St. 754 representation.

On the other hand, if the zero detector 42 determines that all of the, e(10):e(0) signals, representative of the bits $e_{10} \ldots e_0$ of the exponent field of the number or other value in input register 40, are negated, then it (that is, zero detector 42) will assert the 0_OR_DE-NORM zero or de-normalized signal. It will be appreciated that this will occur if the input register 40 stores a number having the value of positive or negative zero or a number in the de-normalized format of the IEEE Std. 754 representation. In that case, the inverter 50 generates a negated output signal. If the high-order bit (51) of the fraction port "zero," then an f(51) signal will be negated, in which case, OR gate 51 will provide a negated E(11) signal to bit (64) of the output register 41 , corresponding to the high-order bit $E_{11}$ of the exponent field of the common representation. On the other hand, if the high-order bit (51) of the fraction portion of the number or other value in input register 40 has the value "one," then an f(51) signal will be asserted, in which case, OR gate 51 will provide an asserted E(11) signal to bit (64) of the output register 41.

Bits (63) through (53) to be stored in the output register, which correspond to bits $E_{10} \ldots E_0$ of the exponent field of the common representation, are provided by the E(10):E(0) signals from multiplexer 46. Since the 0_OR_DE-NORM zero or de-normalized signal is asserted, the multiplexer 46 is conditioned to couple a 2^11-NUM_0'S ($2^{11}$-number of leading zero's) signal from the two's complement negator 43 to the output register 41 as the E(10):E(0) signal. The two's complement negator 43, in turn, receives a NUM_0'S number of leading zero's signal from the leading zero's counter 44., The leading zero's counter 44 receives the f(51):f(0) fraction signals representative of the $f_{51} \ldots f_0$ fraction bits of the fraction field stored in bits (51) through (0) of the input register 40 and generates the NUM_0's number of leading zero's signal to identify a value "k," in binary-encoded form, corresponding to the number "k" of consecutive bits $f_{51} \ldots f_{51-k}$ of the fraction field having the value zero, to the first bit $f_{(51-k)-1}$ of the fraction field which has the value "one." If all of the f(51):f(0) fraction signals are negated, which will be the case if all of the fraction bits $f_{51} \ldots f_0$ stored in input register 40 have the value zero, then the leading zero's counter 44 will generate a NUM_0'S number of leading zero's signal representing the value "fifty-two;" it will be appreciated that this will occur if the number stored in the input register 40 corresponds to either value positive or negative zero.

The NUM_0'S number of leading zeros signal provided by the leading zero's counter 44 to the two's complement negator 43 is an eleven-bit signal. The two's complement negator 43 generates the 2^11-NUM_0'S ($2^{11}$-number of leading zero's) signal as the two's complement of the NUM_0'S number of leading zero's signal, which, in turn, generally provides a binary encoded value corresponding to $2^{11}$-k, where, as above, "k" corresponds to the number "k" of consecutive bits $f_{51} \ldots f_{51-k}$ of the fraction field having the value zero, to the first bit $f_{(51-k)}$ of the fraction field which has the value "one." If "k" is zero, which will be the case if the high-order bit (51) of the fraction field has the value "one," then the two's complement negator 43 provides the value zero.

Thus, when the LD_OUT_REG_41 load output register 41 signal is asserted, the negated E(11) exponent signal from OR gate 51 and the E(10):E(0) exponent signals from multiplexer 46 will be stored in the bits (64) through (53) of the output register 41, thereby to provide the bits $E_{11} \ldots E_0$ of the exponent field of the common representation. Since the E(11) signal is negated, the value of the high-order bit $E_{11}$ of the exponent field will be "zero," if "k" is greater than zero, or "one," if "k" is equal to zero. Accordingly, since the E(10):E(0) signals from multiplexer 46 represents the value $2^{11}$-k, or "zero" if "k" is zero, the bits $E_{11} \ldots E_0$ of the exponent field represent the value $2^{11}$-k.

The NUM_0'S number of leading zero's signal generated by leading zero's counter 44 is also provided to the left shifter 45. The left shifter 45 also receives the f(51):f(0) fraction signals from the input register 40 and generates SHIFTED_(51):f(0) shifted fraction signals, which correspond to the f(51):f(0) signals shifted to the left by a number of bit positions corresponding to the value "k," modulo fifty-two, that is, the SHIFTED_f(i) shifted fraction signal (index "i" being an integer from zero to fifty-one), corresponds to the f(i+k, modulo 52) fraction signal. Thus, for example, if the $f_{40}$ fraction bit is the first bit of the fraction portion having the value "one," "k" will have the value eleven, so that the SHIFTED_f(51:f(11) shifted fraction signals provided by left shifter 45 will correspond to the f(40):f(0) fraction signals, respectively, provided by the input register 40, and the SHIFTED_f(10):f(0) shifted fraction signals provided by the left shifter 45 will correspond to the f(51):f(41) fraction signals provided by the input register 40. It will be appreciated that, if the number stored in the input register 40 is in de-normalized format, the SHIFTED_f(51) shifted fraction signal will be asserted, representing the value "one." It will farther be appreciated that, if all of the f(51):f(0) fraction signals are negated, which will be the case if the number stored in input register 40 is either positive or negative zero, the left shifter 45 can provide each SHIFTED_f(i) fraction signal as the correspondingly-indexed f(i) fraction signal.

The SHIFTED_f(51):f(0) shifted fraction signals are provided, along with a low order "0" zero signal, to the second input of multiplexer 47. Since the 0_OR_DE-NORM zero or de-normalized signal provided by the zero detector 42 is asserted, the multiplexer 47 couples the SHIFTED_f(51):f(0) shifted fraction signals and the 0 zero signal to the output register 41 as F(52):F(0) fraction signals. That is, the multiplexer 45 couples each SHIFTED_f(i) shifted fraction signal (index "i" being an integer from zero to fifty-one) to the output register as the F(i+1) fraction signal, and the 0 zero signal as the F(0) fraction signal. The F(52):F(0) fraction signals will be stored in bits (52) through (0) of the output register 41 when the LD_OUT_REG_41 signals is asserted, thereby to provide the fraction portion of the number in the common representation. It will be appreciated that, if the number in the input register 40 is in the de-normalized format of the IEEE Std. 754 representation, the bit (52) of the output register 41 will have the value "one," so that the number in the output register 41 will be normalized. On the other hand, if the number in the input register 40 is either positive or negative zero, all of the bits (52) through (0) will have the value "zero."

FIG. 3 depicts a functional block diagram of the converter 33 for converting numbers and other values in the common representation to the double format of the IEEE Std. 754 representation. With reference to FIG. 3, converter 33 includes a sixty-six bit input register 60, a sixty-four bit output register 61, a two's complement negation circuit 62, a zero detector 63, a right shifter 64, a gated driver 65, an inverter 66, an AND gate 67 and a multiplexer 70. The input register 60 receives a number or other value in the sixty-six bit common representation, and components 62 through 67 and 70 generate bit values for the sixty-four bit IEEE Std. 754 representation which are loaded into the output register 61. The input register 60 operates to store the number or other value in the sixty-six bit common representation in response to a LD_IN_REG_60 load input register 60 signal from the control circuit 23, and the output register 61 operates to store the sixty-four bit IEEE Std. 754 representation in response to a LD_OUT_REG_61 load output register 61 signal also from the control circuit 23. The control circuit 23 may also provide control signals for controlling the other components of the converter 33 as necessary. It will be appreciated that the input register 60 may comprise a register in floating point register set 31 or the bus interface and the output register 41 may comprise a register in the scalar register set 34 or bus interface 22.

The input register 60 operates to store the number or other value in the sixty-six bit common representation, that is to be converted to the IEEE Std. 754 representation in the converter 33. As noted above, numbers and other values in both the common representation and the IEEE Std. 754 representation comprise a sign field, an exponent field and a fraction field. For input register 60, which stores the number or other value in the common representation, high-order bit (65) of input register 60 stores the bit comprising the sign field, intermediate bits (64) through (53) of input register 60 store bits $E_{11} \ldots E_0$ comprising the exponent field and low-order bits (52) through (0) of input register 60 store bits $F_{52} \ldots F_0$ comprising the fraction field. For output register 61, which stores the number or other value in the IEEE Std. 754 representation, high-order bit (63) of output register 41 stores the bit comprising the sign field, intermediate bits (62) through (52) of output register 41 store bits $e_{10} \ldots e_0$ comprising the exponent field and low-order bits (51) through (0) of output register 41 store bits $f_{51} \ldots f_0$ comprising the fraction field.

As noted above, the sign bit of the number or other value in the IEEE Std. 754 representation corresponds to the sign bit of the number or other value in the common representation. Accordingly, the high order bit (65) of the input register 60 provides an "S" sign signal that is provided to high order bit (63) of the output register 61 without modification. When the LD_OUT_REG_61 load output register 61 signal is asserted, the "S" signal from the input register 60 will be stored in the high order bit (63) of the output register 61 to provide the sign field of the IEEE Std. 754 representation. It will be appreciated that the value stored in the high order bit (63) of output register 61 will correspond to the value stored in the high order bit (65) of the input register 60.

Bits (64) through (53) of the input register 60, which store bits $E_{11} \ldots E_0$, respectively comprising the exponent field of the number or other value in the common representation, provide an E(11) exponent signal, in the case of bit (64) of input register 60, and E(10):E(0) exponent signals, in the case of bits (63) through (53) of input register 60. The E(10):E(0) exponent signals are provided in parallel to one input of a gated driver 65, which, in turn, is controlled by the E(11) exponent signal. If the E(11) exponent signal is asserted, then the gated driver couples the E(10):E(0) exponent signals as e(10):e(0) exponent signals, to the output register 61, in particular, to bits (62) through (52) of output register 61. It will be appreciated that the E(11) exponent signal will be asserted if the bit (64) of input register 60, which stores bit $E_{11}$ of the exponent field of the common representation, has the value "one," which, in turn, will be the case if the input register 60 is storing a value that is positive or negative infinity, a number whose value is in range appropriate for the IEEE Std. 754 normalized number format, a number whose value is in the range appropriate for a number in the de-normalized format with the most significant bit $f_{51}$ of the fraction field having the value "one," or a value that is not a number (NaN). In that case, the bits $e_{10} \ldots e_0$ comprising the exponent field of the IEEE Std. 754 representation correspond to bits $E_{10} \ldots E_0$ of the common representation, which, in turn, are represented by the E(10):E(0) signals provided to the gated driver 65. The asserted E(11) signal enables the gated driver 65 to couple the E(10):E(0) signals as e(10):e(0) exponent signals to bits (62) through (52) of the output register 61. When the LD_OUT_REG_61 load output register 61 signal is asserted, the e(10):e(0) exponent signals will be latched into the respective bits (62) through (52) of the output register 61, thereby to provide the appropriate bits for the exponent field of the IEEE Std. 754 representation.

On the other hand, if the E(11) exponent signal is negated, then the e(10):e(0) signals will all be negated. It will be appreciated that the E(11) exponent signal will be negated if the bit (64) of input register 60, which stores bit $E_{11}$ of the exponent field of the common representation, has the value "zero," which, in turn, will be the case if the input register 60 is storing a value that is positive or negative zero, or a number whose value is in range appropriate for the IEEE Std. 754 de-normalized number format with the most significant bit $f_{51}$ having the value "zero." In that case, the bits $e_{10} \ldots e_0$ comparing the exponent field of the IEEE Std. 754 representation all should have the binary value "zero." When the LD_OUT_REG_61 load output register 61 signal is asserted, the e(10):e(0) exponent signals will be latched into the respective bits (62) through (52) of the output register 61, thereby to provide the appropriate bits, all of which have the value "zero," for the exponent field of the IEEE Std. 754 representation.

The E(10):E(0) exponent signals provided by bits (63) through (53) of input register 60 are also provided to the zero detector 63. If the input register 60 is storing a value that is positive or negative infinity, a value in the range appropriate for the IEEE Std. 754 normalized number format, or a value that is not a number ("NaN"), then the bits (51) through (0) of the common representation in input register 60 comprise the fraction portion of the IEEE Std. 754 representation. The bits (52) through (0) of the input register 60 provide respective F(52):F(0) fraction signals, with the F(51):F(0) fraction signals, representing the bits $F_{51} \ldots F_0$ of the fraction field of the common representation, being provided to one input of multiplexer 70. If the E(11) signal is asserted, and if the zero detector 63 determines that at least one of the E(10):E(0) signals is asserted, then AND gate 67 will assert a NOT_0_OR_DE-NORM not zero or de-normalized signal, which, in turn enables the multiplexer 70 to couple the F(51):F(0) fraction signals to output register 61 as f(51):f(0) fraction signals. When the LD_OUT_REG_61 load output register 61 signal is asserted, the f(51):f(0) fraction signals will be latched into respective bits (51) through (0) of the output register 61, thereby to provide the appropriate bits for the fraction field of the IEEE Std. 754 representation.

The E(10):E(0) exponent signals provided by bits (63) through (53) of input register 60 are also provided to the two's complement negator 62. It will be appreciated that, if the value stored in input register 60 is in the range appropriate for the IEEE Std. 754 de-normalized number format, then the bits F(52):F(0) will need to be shifted to the right by a number "i" of bit positions related to the absolute value of the difference between zero, the value of the exponent in the IEEE Std. 754 de-normalized number format, and the binary-encoded value represented by the bits (63) through (53) of input register 60. The two's complement negator 62 generates the value "i" and provides that value, as a NUM_0'S number of leading zero's signal, to the right shifter 64. The right shifter 64, in turn, receives the F(52):F(1) fraction signals from the input register 60 and generates SHIFTED_F(52):F(1) shifted fraction signals, where each SHIFTED_F(k) sifted fraction signal corresponds to (i) the F(k+i) fraction signal, where "i" corresponds to the binary-encoded value of the NUM_0'S number of leading zeros signal, for each "k+i" less than or equal to fifty-two, or (ii) a negated signal, representing the value "zero," for "k+i" greater than fifty-two.

The SHIFTED_F(52):F(1) shifted fraction signals are provided to a second input of multiplexer 70. If (i) the high-order E(11) exponent signal is negated, which will be the case if the value stored in the input register 60 is either positive or negative zero or a number in the range appropriate for the de-normalized format of the IEEE Std. 754 representation for which the most significant bit $f_{51}$ has a value other than one, or (ii) the high-order E(11) signal is asserted, and the other signals E(10):E(0) are negated, which will be the case if the value stored in the input register 60 is a number in the range appropriate for the de-normalized format of the IEEE Std. 754 representation for which the most significant bit $f_{51}$ has a value of one, the AND gate 67 will be de-energized, thereby to negate the NOT_0_OR_DE-NORM not zero or de-normalized signal. In that case, the multiplexer 70 will be enabled to couple the SHIFTED_F(52):F(1) fraction signals to the output register 61 as the f(51):f(0) fraction signals. When the LD_OUT_REG_61 load output register 61 signal is asserted, the f(51):f(0) fraction signals will be latched into respective bits (51) through (0) of the output register 61, thereby to provide the appropriate bits for the fraction field of the IEEE Std. 754 representation.

As described above, the rounding unit 38 performs arithmetical rounding of the results generated by the elements 35, 36 and 37 of functional unit 30 (FIG. 1) to accommodate various rounding modes defined by the IEEE Std. 754. Generally, for, the adder 35, multiplier 36 and divider 37, which perform addition, multiplication and division operations in connection with the respective fraction fields of the numbers and other values coupled thereto by the control circuit 23, these components will provide a number of additional, less significant, bits, which are used in generating the final, rounded, fraction field for storage in a register in the floating point register set 31. Thus, if, for example, the bits comprising fraction fields for numbers and other values A and B provided to the adder 35, multiplier 36 or divider 37 are designated $F^A_{52} \ldots F^A_0$ and $F^B_{52} \ldots F^B_0$, respectively, then the result number or other value R provided by the multiplier 36 or divider 37, designated $F^R_{52} \ldots F^R_0 F^R_{-1} \ldots F^R_{-N}$, includes "N" less significant bits $F^R_- \ldots F^R_{-N}$, which may be processed in connection with the other bits $F^R_{52} \ldots F^R_0$ to provide a final result fraction field that is stored in the floating point register set 31.

As noted above, the IEEE Std. 754 defines several rounding modes. Operations performed by the rounding unit 38 in connection with one of the rounding modes, in particular, a "round to nearest" mode, will be described herein, and operations in connection with other modes will be apparent to those skilled in the art. By way of background, in connection with the round to nearest mode performed by a rounding unit for numbers in the double format of the IEEE Std. 754 representation, for fraction fields for numbers and other values provided by to a multiplier or divider are designated $f^A_{51} \ldots f^A_0$ and $f^B_{51} \ldots f^B_0$, respectively, then the result number or other value R provided by the multiplier or divider, designated $f^R_{51} \ldots f^R_0 f^R_- \ldots f^R_{-N}$, includes "N" less significant bits $f^R_- \ldots f^R_{-N}$. Generally, in the "round to nearest" mode, if (i) the binary encoded value of the "N" less significant bits $f^R_- \ldots f^R_{-N}$ is less than or equal to one-half, then the value "zero" will be added to the binary encoded value of bits $f^R_{51} \ldots f^R_0$ to provide the final result fraction field, but (ii) if the binary encoded value of the "N" less significant bits $f^R_- \ldots f^R_{-N}$ is greater than one-half, then the value "one" will be added to the binary encoded value of bits $f^R_{51} \ldots f^R_0$ to provide the final result fraction field.

It will be appreciated that (i) will occur if
(a) the bit $f^R_-$ has the value "zero," or
(b) the bit $f^R_-$ has the value "one" and bits $f^R_{-2} \ldots f^R_{-N}$ all have the value "zero,"

and that (ii) will occur if the bit $f^R_-$ has the value "one" and at least one of bits $f^R_{-2} \ldots f^R_{-N}$ have a value other than zero. To generate a final result fraction field or numbers and other values in the IEEE Std. 754 representation, a rounding unit typically generates two bits from the less significant bits, namely, a guard bit "g," which corresponds to the value of bit $f^R_-$ and a "sticky" bit "s," which has the value "zero" if all of the bits $f^R_{-2} \ldots f^R_{-N}$ have the value "zero" and "one" if at least one of bits $f^R_{-2} \ldots f^R_{-N}$ have a value other than zero, and further generates a value "result" which corresponds to $f^A_{51} \ldots f^A_0 gs$, that is, the guard and sticky bits concatenated onto the fraction field provided by the multiplier or divider.

Thereafter, the rounding unit:
(1) generates a "guard" value corresponding to the "result" value shifted left by one bit position, thereby to provide the value $f^A_{51} \ldots f^A_0 gs0$,
(2) generates a "sticky" value corresponding to the "result" value shifted left by two bit positions, thereby to provide the value $f^A_{51} \ldots f^A_0 gs00$,
(3) generates a "correction" value corresponding to "4 AND" (guard AND (sticky OR result)), where "AND" and "OR" represent respective bit-wise "AND" and "OR" operations, and
(4) generates the final rounded result value for the fraction field as (result+correction), shifted right by two bit positions.

It will be appreciated that operations (1) and (2) essentially place the guard and sticky bits in the same bit position as the bit $f^R_0$ in the "result" value. Further, in operation (3), the operation "(guard AND (sticky OR result))" provides, in the third least significant bit position, the appropriate correction value for the "round to nearest" mode, and the value "4," which corresponds to the binary-encoded value "0 . . . 0100" provides a mask that, when ANDed with the value provided by "(guard AND (sticky OR result))," provides the value "0 . . . 0c00," Where "c" is the value of the bit in the third least significant bit position of the "(guard AND (sticky OR result))" value. In step (4), the correction value "0 . . . 0c00" generated in step (3) is added to result value $f^A_{51} \ldots f^A_0 gs$ and the sum shifted right by two bit positions to eliminate the guard and sticky bits "g" and "s." This final result fraction field thus corresponds to "$f^A_{51} \ldots f^A_0$+0 . . . 0c."

The rounding unit 38 provided in the functional unit 30 for numbers and other values in the common representation performs generally similar operations, except that, a complication arises in connection with numbers which would, in the IEEE Std. 754 representation, be in the de-normalized format. For numbers and other values in the common representation which would, in the IEEE Std. 754 representation, be in a format other than the de-normalized format, the rounding unit 38 can use the steps (1) through (4) above to provide a suitable rounded result value, that is, one that conforms to the rounded result value that would be generated for such numbers and other values by a conventional rounding unit as described above. However, a problem arises in connection with result values for numbers in the common representation which would, in the IEEE Std. 754 representation, be in the de-normalized format. This arises from the fact that a number which would, in the IEEE Std. 754 representation, be in the de-normalized format, in the common representation is normalized, that is, as described above, the fraction field in the common representation may be shifted relative to the fraction field in the IEEE Std. 754 representation. Accordingly, to provide computational behavior similar to that which would be provided for a number in the IEEE Std. 754 representation, the particular bit position in the common representation at which the rounding correction is applied, is not necessarily the low-order bit position of the fraction field, but instead may be a different bit position, the bit position reflecting the amount of shift.

To generate a rounded result in the "round to nearest" mode, the rounding unit 38 generates a guard bit "g" and a sticky bit "s," which correspond to the guard and sticky bits which would be provided by a conventional rounding unit, and a result value corresponding to $F^R_{52} \ldots F^R_0 gs$. Thereafter, the rounding unit 38:

(I) generate a rounding_position_mask corresponding to the binary representation for the value "4" (that is, "0 . . . 0100") shifted to the left by "k" bit positions, where "k" corresponds to
  (a) "zero," if the most significant bit of the exponent field $E_{11}$ has the value "one," and
  (b) the difference between "100000000000" and the value of the exponent of the result, if the most significant bit $E_{11}$ of the exponent field has the value "zero;" it will be appreciated that, if the most significant bit $E_{11}$ of the exponent field of the result has the value "zero," the result would, in the IEEE Std. 754 representation, be in the de normalized format, and, to convert the number represented by the result to the IEEE Std. 754 representation, the fraction field of the common representation would be shifted to the right by a number of bit positions corresponding to this difference;

it will be appreciated that, after shifting, the bit position of the rounding_position_mask that has the value "one" corresponds to the least significant bit position $f_0$ for all numbers and other values expressed in the IEEE Std. 754 representation, (II) generates a result mask corresponding to the rounding_position_mask in which
  (a) for the bit position of the rounding_position_mask which has the value "one," the bit in the corresponding bit position of the result_mask will also have the value "one," and
  (b) for bit positions to the left of that bit position in the result mask will also have the value "one;"
it will be appreciated that the result_mask has bits having the value "one" for all of the bit positions in the "result" value $F^R_{52} \ldots F^R_0 gs$ which have valid bits for the IEEE Std. 754 representation, and the value "zero" elsewhere;

(III) generates a value by shifting the result value $F^R_{52} \ldots F^R_0 gs$ to the left by one bit position, thereby to provide a guard value "$F^R_{52} \ldots F^R_0 gs0$" (reference step (1) above);

(IV) generates a value corresponding to "$s_{52} \ldots s_0 00$," where
  (a) $s_0$ has a value corresponding to the sticky bit "s" generated by the rounding unit 38;
  (b) $s_1$ as a value corresponding to "s OR g", where "g" corresponds to the guard bit "g" generated by the rounding unit 38; and
  (c) $S_k$, for $k \geq 2$, has the value
    (A) "one" if the value of either the sticky bit "s" or the guard bit "g" has the value "one," or if the value of any bit $F^R_j$, for $j \leq k-2$, has the value "one," or
    (B) zero, otherwise, thereby to provide a sticky value (reference step (2) above);

(V) generates a correction value as "rounding_position_mask AND (guard AND (sticky OR result))" (reference step (3) above); it will be appreciated that
  (a) the guard and sticky values effectively provide appropriate guard and sticky bits at each of the possible rounding positions as identified by the rounding_position_mask, thus, the value "(guard AND (sticky OR result))" at each bit position provides a potential correction value at each of the possible rounding positions, and
  (b) by ANDing the value "(guard AND (sticky OR result))" with the rounding_position_mask, the rounding unit 38 provides the proper correction value at the bit position at which rounding is to occur; and (VI) generates the rounded result value for the fraction field as "((result AND result_mask)+correction)," shifted to the right by two bit positions; it will be appreciated that the value represented by "(result AND result_mask)" in the common representation comprises those bits that would be valid bits in the IEEE Std. 754 representation, and zero elsewhere, and the "correction" value is applied at the least significant one of these valid bits.

Figure 4:
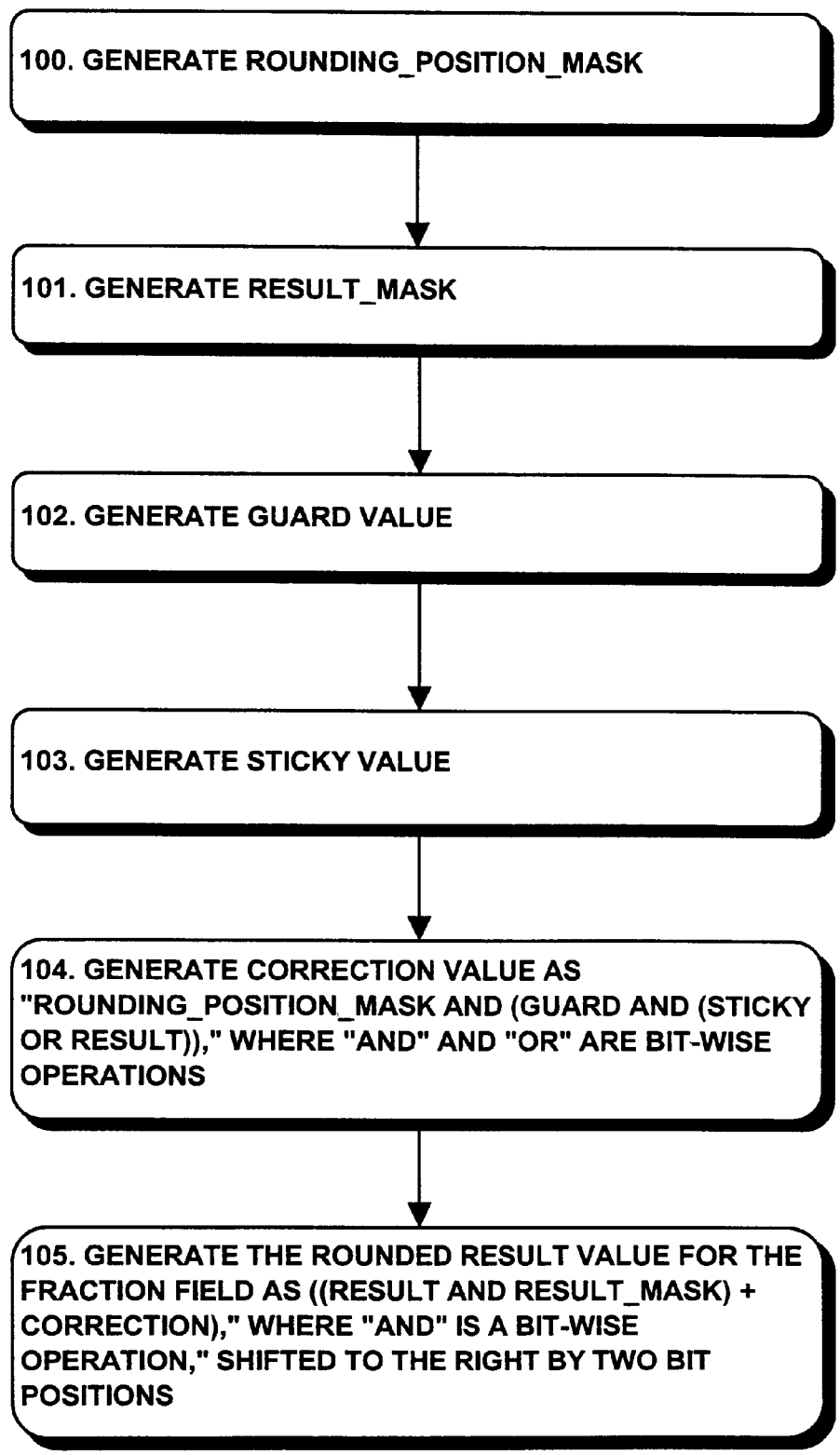
FIG. 4 is a flowchart depicting operations performed by a rounding unit used in the functional unit depicted in FIG. 1 for one rounding mode as defined in IEEE Std. 754.

It will be appreciated that, the rounding unit 38 can, by performing steps (I) through (VI) above, generate the correct rounded result value, in the "round to nearest" rounding mode, for the fraction field of numbers and other values which would be in any of the formats for the IEEE Std. 754 representation, including numbers in the normalized format, numbers having the value positive or negative zero, numbers having the values positive or negative infinity, and "NaN" ("not a number") values, as well as number in the de-normalized format. Operations described above in connection with items (I) through (VI) are depicted the flowchart contained in FIG. 4 attached hereto.

The invention provides a number of advantages. In particular, it provides a common representation for floating point numbers and other values which are expressed in various formats in the IEEE Std. 754 representation. By providing a common representation, computation among the numbers and other values which would, in the IEEE Std. 754 representation, be expressed in different formats is simplified, since format conversion is only required twice, namely, when the numbers and other values in the IEEE Std. 754 representation are retrieved and loaded into the floating point register set 31, and when the numbers and other values in the common representation in floating point register set 31 need to be converted to the IEEE Std. 754 representation for, for example, storage in the memory subsystem 12.

As noted above, the illustrative embodiment has been described in connection with the sixty-four bit IEEE Std. 754 "double" format and the corresponding sixty-six bit common representation. Extensions to the thirty-two bit IEEE Std. 754 "single" format and a corresponding thirty-four bit common representation will be apparent to those skilled in the art. In addition, extensions of the rounding unit to accommodate other rounding modes defined in IEEE Std. 754 will be apparent to those skilled in the art.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system maybe operated and/or other wise controlled by means of in formation provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A rounding unit for use in connection with a floating point processor, the floating point processor generating a result floating point value representing as elected arithmetic operation applied to at least one input floating point value, the result floating point value comprising an exponent field and a fraction field, the fraction field comprising a plurality of digit locations each having at least one digit, the rounding unit being configured to receive the result floating point value from the floating point process and generate therefrom a rounded result floating point value, the rounding unit comprising:

A. a rounding position mask generator configured to generate a rounding position mask from an exponent value in the exponent field, the rounding position mask identifying one of the digit locations of the fraction field at which a correction value is to be applied;

B. a result mask generator configured to generate a result mask, the result mask identifying the digit location of the fraction field at which the correction value is to be applied, as well as at least some of the digit locations that are more significant ones thereof;

C. a rounded value generator configured to generate the correction value and generate the rounded floating point value in relation to the correction value, the rounding position mask and the result mask.

2. A rounding unit as defined in claim 1 in which the rounding unit operates in accordance with a round-to-nearest operating mode, in that mode the rounding unit being configured to generate from the result floating point value a guard digit having a value corresponding to a digit in a predetermined one of the digit locations, a sticky digit having a first predetermined value if a digit in at least one of said digit locations less significant than the predetermined one of the digit location has a predetermined value, the rounded value generator comprising:

A. a guard value generator configured to generate a guard value in relation to the result floating point value and the guard digit;

B. a sticky value generator configured to generate a sticky value in relation to the result floating point value, the guard digit and the sticky digit;

C. a correction value generator configured to generate the correction value in relation to the rounding position mask, the result floating point value, the guard value and the sticky value; and D. a rounded result generator for using the correction value, the result floating point value and the result mask to generate the rounded floating point value.

3. A method of rounding a result floating point value, the result floating point value comprising an exponent field and a fraction field, the fraction field comprising a plurality of digit locations each having at least one digit, thereby to generate a rounded result floating point value, the method comprising the steps of:

A. generating a rounding position mask from an exponent value in the exponent field, the rounding position mask identifying one of the digit locations of the fraction field at which a correction value is to be applied;

B. generating a result mask, the result mask identifying the digit location of the fraction field at which the correction value is to be applied, as well as at least some of the digit locations that are more significant ones thereof;

C. generating the correction value and generate the rounded floating point value in relation to the correction value, the rounding position mask and the result mask.

4. A method as defined in claim 3, the method being performed in accordance with a round-to-nearest operating mode, in that mode the method being further performed in connection with a guard digit having a value corresponding to a digit in a predetermined one of the digit locations, and a sticky digit having a first predetermined value if a digit in at least one of said digit locations less significant than the predetermined one of the digit location has a predetermined value, the rounded value generating step comprising the steps of:

A. generating a guard value in relation to the result floating point value and the guard digit;

B. generating a sticky value in relation to the result floating point value, the guard digit and the sticky digit;

C. generating the correction value in relation to the rounding position mask, the result floating point value, the guard value and the sticky value; and D. using the correction value, the result floating point value and the result mask to generate the rounded floating point value.

* * * * *

UNITED STATES PATENT AND TRADEMARK OFFICE
CERTIFICATE OF CORRECTION

PATENT NO.   : 6,356,927  
DATED        : March 12, 2002  
INVENTOR(S)  : Guy L. Steele, Jr.

Page 1 of 1

It is certified that error appears in the above-identified patent and that said Letters Patent is hereby corrected as shown below:

<u>Column 20,</u>
Line 49, replace "as elected" with -- a selected --.

Signed and Sealed this

Twenty-first Day of May, 2002

Attest:

Attesting Officer

JAMES E. ROGAN
*Director of the United States Patent and Trademark Office*